United States Patent [19]

Tsujimura et al.

[11] Patent Number: 4,514,892
[45] Date of Patent: May 7, 1985

[54] MACHINE TOOL

[75] Inventors: Isao Tsujimura, Toyohashi; Takani Yoshimi, Gamagori, both of Japan

[73] Assignee: Toyoda Koki Kabushiki Kaisha, Kariya, Japan

[21] Appl. No.: 339,453

[22] PCT Filed: Oct. 1, 1981

[86] PCT No.: PCT/JP81/00261

§ 371 Date: Jan. 6, 1982

§ 102(e) Date: Jan. 6, 1982

[87] PCT Pub. No.: WO82/02848

PCT Pub. Date: Sep. 2, 1982

[30] Foreign Application Priority Data

Feb. 27, 1981 [JP] Japan .................................. 56-26925

[51] Int. Cl.³ ........................................... B23Q 3/157
[52] U.S. Cl. ........................................ 29/568; 29/52; 29/26 A; 211/1.5
[58] Field of Search .................... 29/568, 26 A, 52, 53, 29/54, 55, 565; 408/35, 31; 409/202, 212; 211/1.3, 1.5, 60 T, 69

[56] References Cited

U.S. PATENT DOCUMENTS

| 3,171,327 | 2/1965 | Williamson | 29/57 |
| 3,332,142 | 7/1967 | Lehmkuhl et al. | 29/568 |
| 3,344,512 | 10/1967 | Zuchellini | 29/568 |
| 3,414,967 | 12/1968 | Erikson | 29/568 |
| 3,715,801 | 2/1973 | Sato et al. | 29/568 |
| 3,858,286 | 1/1975 | Nohejl | 29/568 |
| 4,000,954 | 1/1977 | Patel | 408/31 |
| 4,053,968 | 10/1977 | Johnson et al. | 279/1 TS |
| 4,088,417 | 5/1978 | Kosmowski | 408/43 |
| 4,145,802 | 3/1979 | d'Auria | 29/568 |
| 4,358,888 | 11/1982 | Zankl et al. | 408/35 |

FOREIGN PATENT DOCUMENTS 157413 3/1980 Japan .................................. 29/568

Primary Examiner—Gil Weidenfeld
Assistant Examiner—Daniel W. Howell
Attorney, Agent, or Firm—Oblon, Fisher, Spivak, McClelland & Maier

[57] ABSTRACT

A machine tool having a gate-type construction and provided with a tool magazine (11). The tool magazine (11) is mounted between a pair of support portions (3a) of a gate-shaped column (3) and above a work support table (2). The tool magazine (11) is composed of a plurality of tool holders (16) each holding a tool (17), and a driving device (18) for moving the tool holders (16) back and forth. This arrangement permits an efficient use of the working space on the work support table (2), and makes it possible to reduce the sizes of the support table (2) and a bed (1).

4 Claims, 8 Drawing Figures

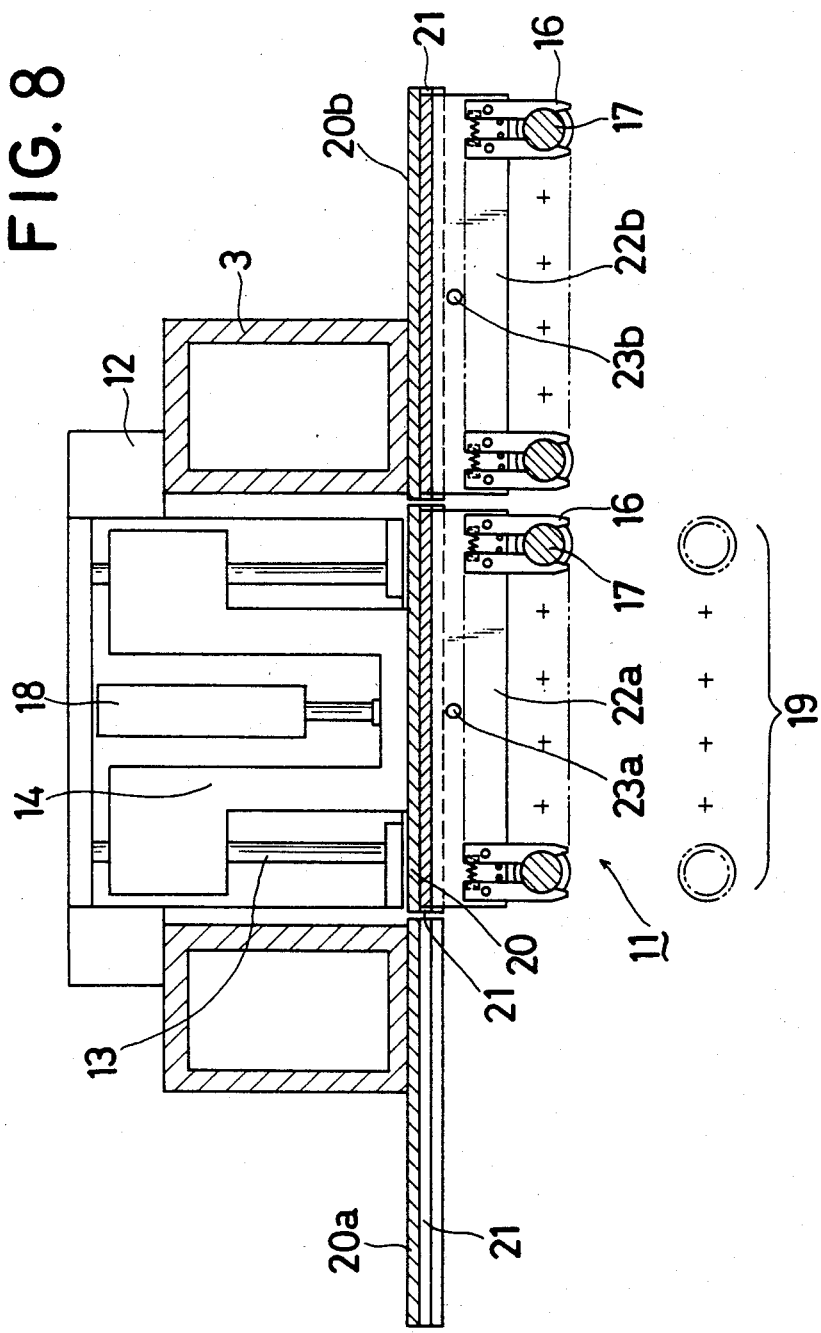

MACHINE TOOL

TECHNICAL FIELD

The present invention relates to a machine tool and, more particularly, to a machine tool having a gate-type construction, provided with an improved tool magazine.

BACKGROUND ART

Such a machine tool is known already as having a support table mounting a workpiece and carrying a tool magazine from which necessary tools are taken out successively to effect various machinings in sequence. In the known machine tool of the kind described, as shown, for example, in the specification of U.S. Pat. No. 3,709,623, the tool magazine is placed at one end of the support table so as not to hinder the machining of the workpiece, so that the support table is made to travel a distance greater than the stroke necessary for the ordinary machining, when the tool is replaced. In consequence, the working space on the support table is undesirably limited by the installation of the tool magazine. The size of the support table also has to be increased to require larger sizes of devices such as bed, table feed device and so forth.

DISCLOSURE OF THE INVENTION

Under this circumstance, the present invention aims as its object at providing a gate-type machine tool in which the working space on the support table is not limited and in which the stroke of the support table is reduced to permit a reduction in the sizes of the support table and the bed, thereby to overcome the above-described problems of the prior art. To this end, according to the invention, there is provided a machine tool comprising: a bed; a gate-shaped column straddling a work support table; a spindle mounted on a cross-slide portion of the gate-shaped column and rotatable around a vertical axis; said spindle being movable in the vertical direction toward and away from the work support table and slidable horizontally perpendicularly to the direction of up and downward movement; wherein the improvement comprises a tool magazine mounted between the support portions of the gate-shaped column and above the work support table, the tool magazine including tool holders adapted to hold the tools of the tool magazine such that the axes of the tools are arranged to extend in the vertical direction and to be in parallel alignment with the sliding direction of the spindle, and a driving device for driving the tool holder in the direction perpendicular to the directions of vertical movement and horizontal sliding of the spindle thereby to bring the tool between a tool mounting/demounting position where the tool aligns with the slide position of the spindle and a position where the tool does not interfere with the spindle.

As stated above, according to the invention, a tool magazine is mounted between the support portions of the gate-shaped column, so that it is possible to make efficient use of the working space on the work support table and to eliminate unnecessary stroke of the work support table. In consequence, the size of the work support table, as well as the size of the bed, can be reduced advantageously.

Furthermore, since the tools on the tool magazine are arranged such that their axes extend in the vertical direction and are in parallel alignment with the direction of sliding of the spindle, it is possible to bring the necessary tool into axial alignment with the spindle by making use of the horizontal sliding movement of the spindle, and to make the mounting and demounting of the tool by making use of the vertical movement of the spindle. It is, therefore, possible to effect a change of the tool without fail by a simple construction.

In the second and third embodiments, the tool holders are mounted shiftably so that it is possible to store and use a larger number of tools even when the slide stroke of the spindle is small. Particularly, in the third embodiment of the invention, it is possible to make preparatory arrangements of the tool magazine during the machining.

BRIEF DESCRIPTION OF THE DRAWINGS

FIG. 8 is a sectional view taken along the line VIII—VIII of FIG. 7.

BEST MODE FOR CARRYING OUT THE INVENTION

Figure 1:
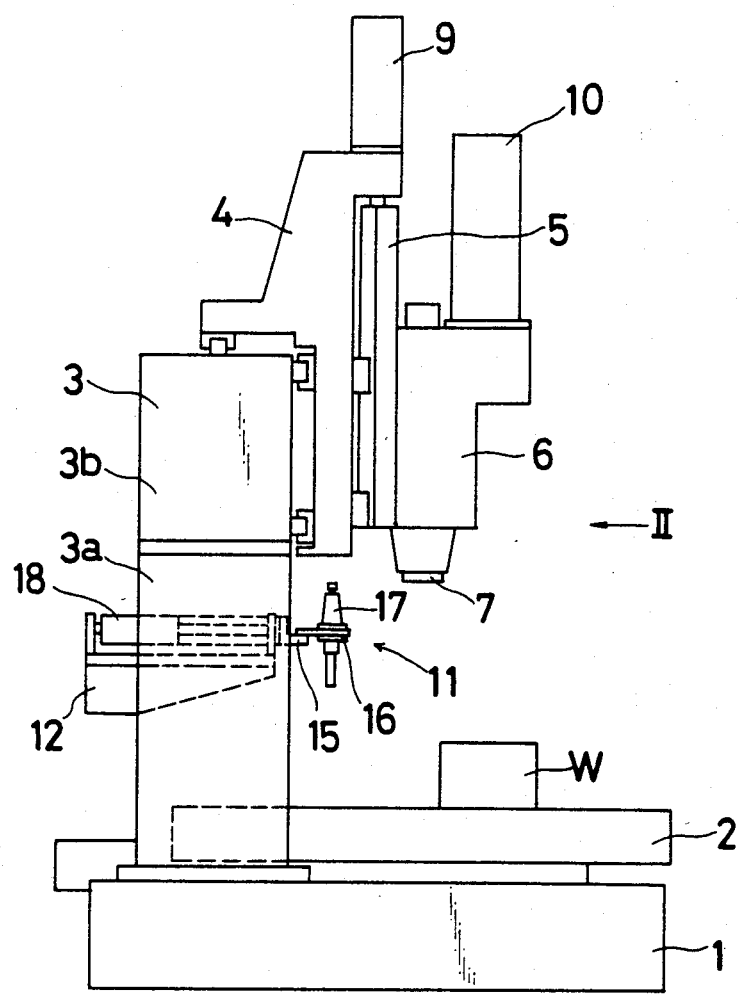
FIG. 1 is a side elevational view of a first embodiment of the invention.
Figure 2:
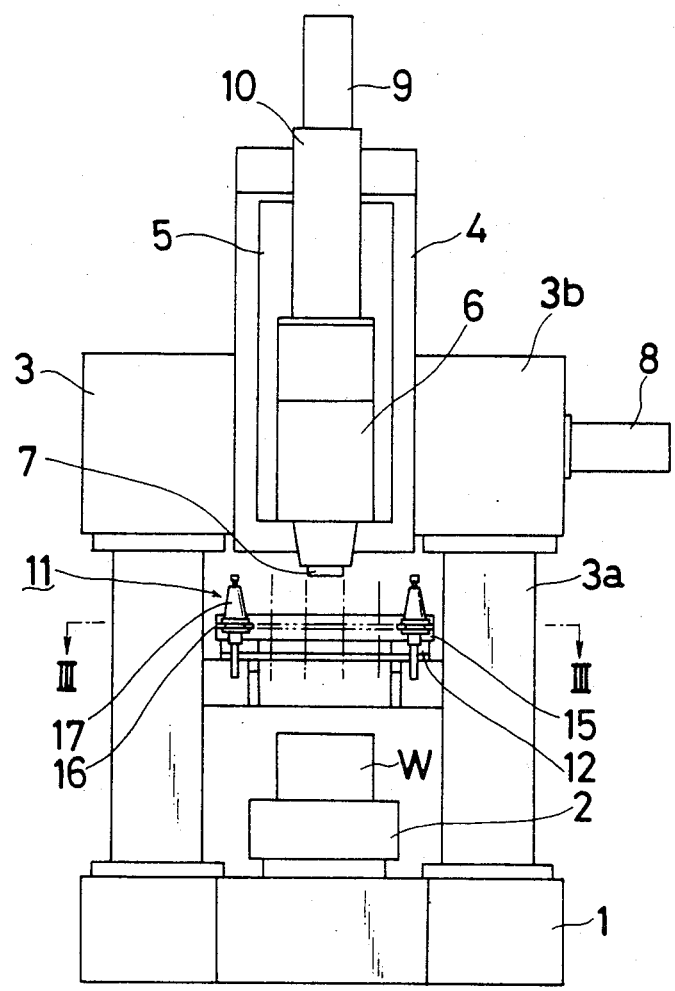
FIG. 2 is an elevational view of the embodiment shown in FIG. 1 as viewed in the direction of an arrow II.
Figure 3:
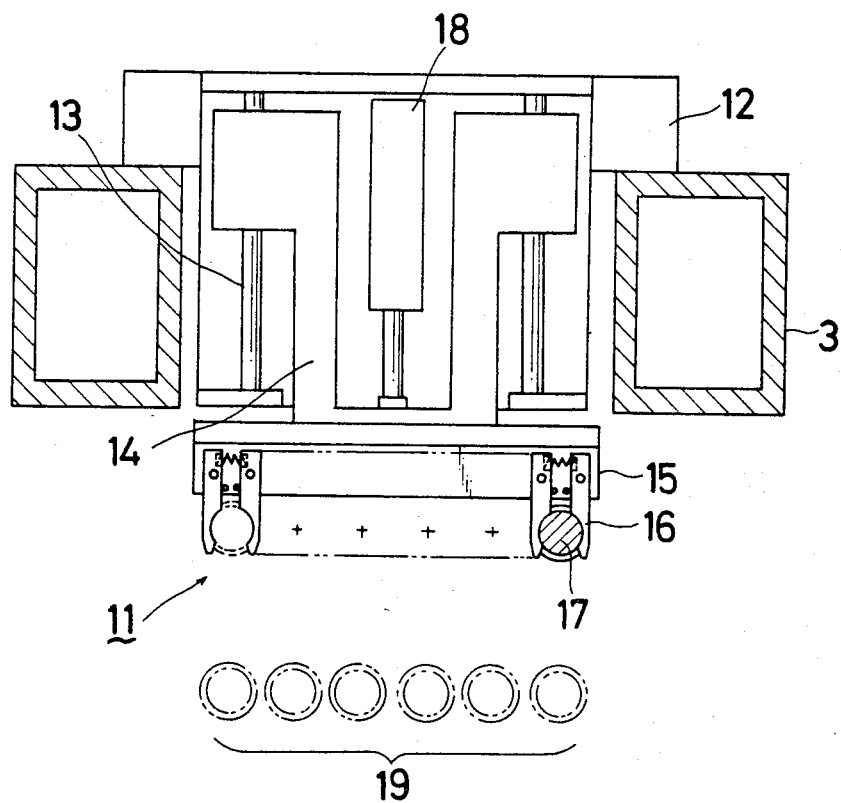
FIG. 3 is an enlarged sectional view taken along the line III—III of FIG. 2.

Preferred embodiments of the invention will be described hereinunder with reference to the accompanying drawings. FIGS. 1 thru 3 show a first embodiment, FIGS. 4 thru 6 show a second embodiment and FIGS. 7 and 8 show a third embodiment of the invention.

The first embodiment of the invention will be described hereinunder with reference to FIGS. 1 thru 3. A reference numeral 1 denotes a bed, 2 denotes a support table movably mounted on the bed 1 for supporting a workpiece W, 3 denotes a gate-shaped column mounted on the bed 1 by means of support portions 3a so as to straddle the support table 2, 4 designates a slide table mounted on a cross-slide portion 3b of the column 3 to be slidable in a horizontal direction, 5 denotes a vertically movable table mounted on the table 4 for free movement in the up and downward directions, and 6 denotes a spindle head integral with the vertically movable table 5. The spindle head 6 carries a spindle 7 which is rotatable around a vertical axis. A reference numeral 8 designates a feed motor mounted on the cross-slide 3b of the column 3 and adapted to feed the slide table 4 in the horizontal direction, 9 denotes a motor mounted on the slide table 4 and adapted to drive the vertically movable table 5 in the up and down directions, and numeral 10 designates a spindle driving motor provided on the spindle head 6.

In the machine tool of the embodiment having the gate-shaped column 3, a tool magazine 11 is installed between the left and right support portions 3a of the column 3 and above the support table 2. Namely, a support bracket 12 is fixed between the left and right support portions 3a. A pair of guide rods 13 fixed to the support bracket 12 has axes which extend in the front and rear directions perpendicular to the directions of the vertical movement of the spindle head 6 and the sliding movement of the slide table 4. The guide rods 13 movably carry a frame 14 to guide the later. The frame 14 is connected to a driving cylinder 18. A supporting member 15 parallel to the sliding direction of the slide table 4 is fixed to the front end of the frame 14. A plurality of tool holders 16 for clamping and holding the tools 17 are arrayed at regular intervals on the supporting member 15.

Figure 4:
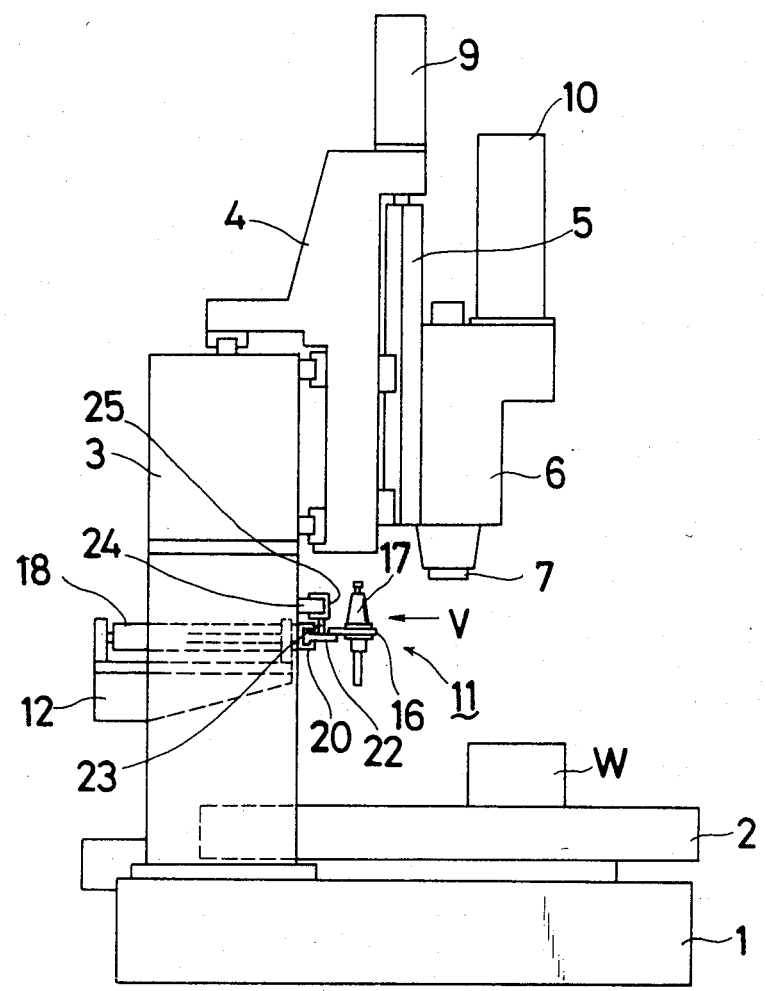
FIG. 4 is a side elevational view of a second embodiment of the invention.
Figure 5:
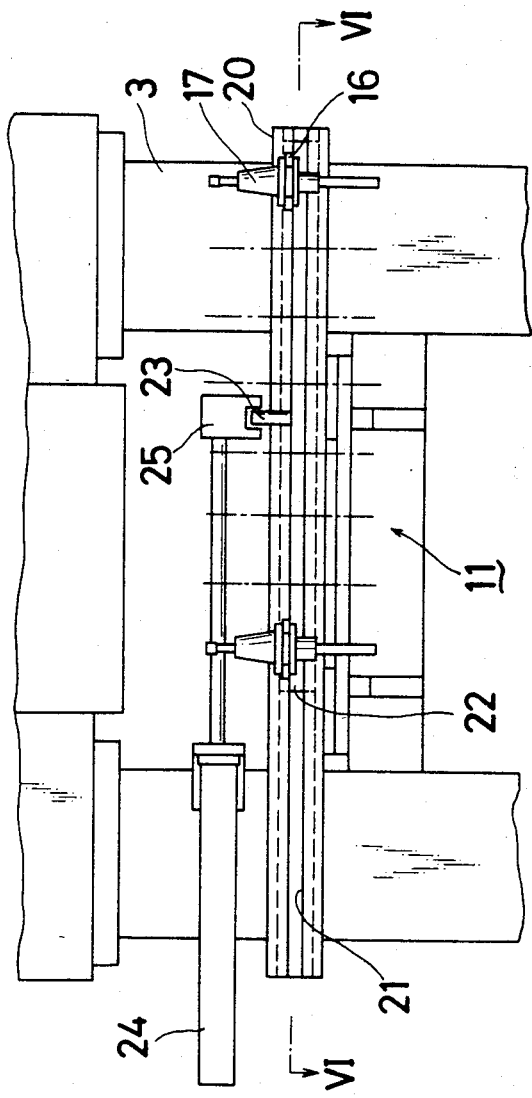
FIG. 5 is an enlarged view of a portion indicated by an arrow V in FIG. 4.
Figure 6:
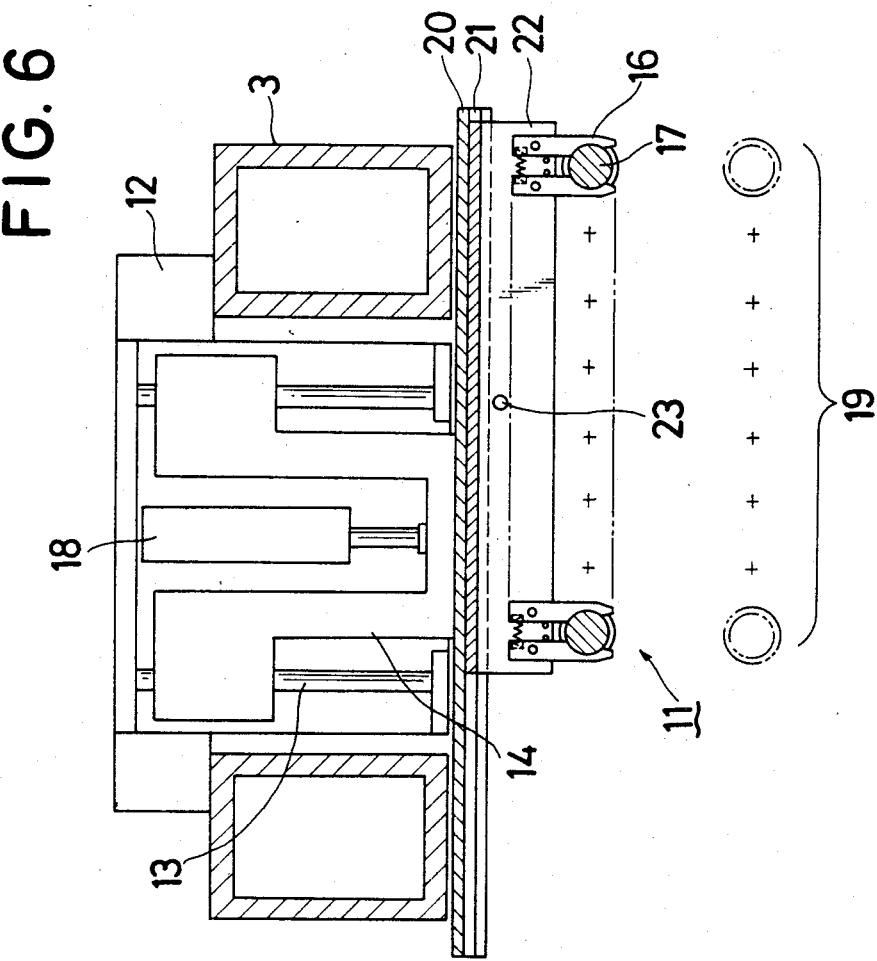
FIG. 6 is a sectional view taken along the line VI—VI of FIG. 5.
Figure 7:
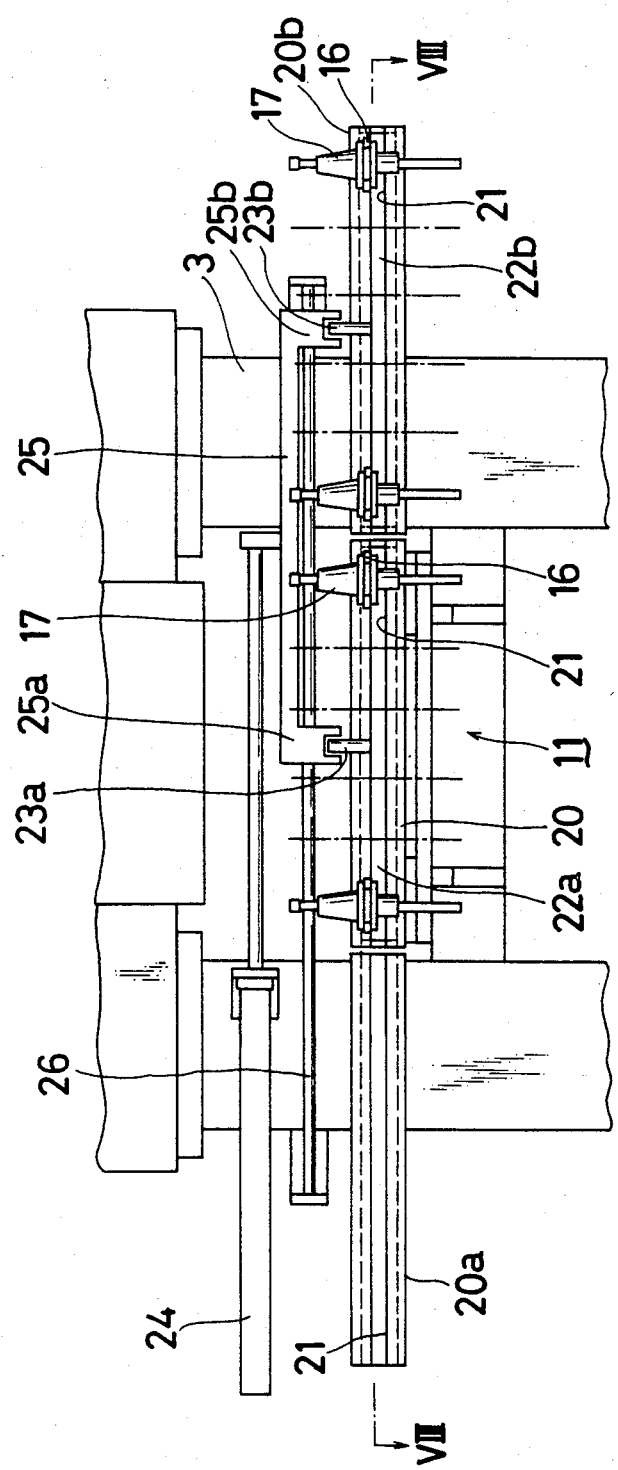
FIG. 7 is an illustration of a third embodiment of the invention, corresponding to the portion indicated by the arrow V in FIG. 4.

Referring now to FIGS. 4 to 6 showing the second embodiment of the invention, the tool magazine 11 includes, in place of the supporting member 15 of the first embodiment fixed to the front end of the frame 14, a guide member 20 which is parallel to the direction of sliding movement of the slide table 4. The guide member 20 has a guide groove 21 which slidably receives and guides a slider 22 on which arrayed are a plurality of tool holders 16. An engaging shaft 23 is formed to protrude from the substantially central portion of the upper surface of the slider 22. An engaging member 25 is fixed to the piston rod end of a cylinder device 24 fixed to the column 3. The engaging member 25 has a slot which extends in parallel with the axis of the guide rod 13 and is adapted to be engaged by the aforementioned engaging shaft 23, so that the slider 22 is shiftable along the guide member 20.

In the third embodiment shown in FIGS. 7 and 8, the tool magazine 11 has a movable guide member 20 fixed to the front end of the frame 14, and a pair of stationary guide members 20a, 20b fixed to the left and right supports of the column 3. Two sets of sliders 22a, 22b of lengths within the span of the movable guide member 20 are arranged such that one of these two sets is shiftably guided by the movable guide member 20, while the other is shiftably guided by one of the stationary guide members 20a, 20b. Needless to say, a multiplicity of tool holders 16 are arrayed on each slider 22a, 22b.

The sliders 22a, 22b have engaging shafts 23a, 23b projected from the substantially central portions of the sliders 22a, 22b. The engaging member 25 has a bifurcated form and is provided with a pair of engaging portions 25a, 25b formed on both legs thereof. Slots are formed in these engaging portions 25a, 25b so as to extend in parallel with the axis of the guide rod 13, and are engaged by the aforementioned engaging shafts 23a, 23b. The piston rod end of the shifting cylinder device 24 fixed to the column 3 is connected to a substantially central portion of the engaging member 25. A rod 26 fixed to the column 3 guides and supports the engaging member 25.

An explanation will be made hereinunder as to the operation of each embodiment. Referring first to the first embodiment, the machine tool is shown in FIG. 1 in the initial state in which the tool magazine 11 has been fully retracted, i.e. in the state in which the frame 14 has been retracted by the driving cylinder 18. For returning a tool 17 after the use on the spindle 7 to the tool magazine 11, the spindle head 6 is lowered vertically as viewed in FIG. 2, and is then moved to the left or right to position the spindle 7 ahead of the vacant tool holder 16. The frame 14 is moved ahead in this state to make the vacant tool holder 16 clamp the tool 17 on the spindle 7. Then, a known tool clamper (not shown) in the spindle 7 is operated to unclamp and release the tool 17. Then, the spindle 7 is moved vertically upwardly, so that the tool 17 is withdrawn from the spindle 7 while being clamped and held by the tool holder 16. The spindle 7 which has been moved to the uppermost position in its vertical stroke is then slided to the position just above the tool holder 16 holding the necessary tool 17, and is then lowered to mount the tool 17. Then, the known tool clamper in the spindle 7 is operated to clamp the tool 17. Thereafter, the frame 14 is retracted to a position where the tool magazine 11 does not interfere with the machining of the workpiece W. Meanwhile, the spindle 7 is lowered in the vertical direction to commence the machining of the workpiece W.

In the second embodiment, the back and forth movement to the tool magazine 11 and the vertical movement of the spindle 7 for changing the tool are performed in the same manner as the first embodiment. The second embodiment can suitably be applied to the case where it is necessary to mount a greater number of tools 17 within a limited slide stroke of the spindle 7. Namely, the slider 22 carries a multiplicity of tool holders 16 for holding greater number of tools 17 than in the first embodiment. Therefore, within a given sliding stroke of the spindle 7, it is not possible to attach the tools located at both end regions. In this second embodiment, however, the shifting cylinder device 24 is operated to shift the slider 22 to the left or right when the tool magazine has been fully retracted, thereby to permit the attaching and detaching of the tools in the both end regions within the given slide stroke of the spindle 7. In this second embodiment, it is possible to obtain a greater range 19 of exchange of tool than the range 19 in the first embodiment.

In the third embodiment, although the range 19 of tool exchange is limited to the range of slide stroke of the spindle 7, it is possible to store and use a greater number of tools 17 than the second embodiment thanks to the use of two sets of sliders 22a, 22b. In addition, for the same reason, it is possible to make preparatory arrangements of the tool magazine 11 even during the machining of the workpiece W. Namely, in the illustrated state, the sliders 22a, 22b are situated on the movable guide member 20 and the right stationary guide member 20b. Therefore, when the tool 17 necessary for the next machining is stored in the right stationary guide member 20b, the shifting cylinder device 24 is activated, in the state where the movable guide member 20 is in the retracted position, to shift the slider 22a from the movable guide member 20 to the vacant stationary guide member 20a, while the slider 22b is shifted from the right stationary guide member 20b to the movable guide member 20 thereby to accomplish the exchange of the two sets of sliders 22a, 22b. It is also possible to replace the slider on the left or right stationary guide members 20a, 20b with another slider prepared at the outside of the machine tool and carrying different tools.

Obviously, numerous modifications and variations of the present invention are possible in light of the above teachings. It is therefore to be understood that within the scope of the appended claims, the present invention may be practiced otherwise than as specifically described herein.

What is claimed is:

1. A machine tool for machining a workpiece comprising:
   a bed;

a workpiece support table slidably mounted on said bed for movement in a first horizontal direction;

a gate-shaped column having a pair of upstanding support portions fixedly mounted on said bed, said upstanding support portions being spaced in a second horizontal direction transverse to said first horizontal direction for permitting said workpiece support table to move thereacross;

a tool spindle mounted on said column for movements in a vertical direction as well as in said second horizontal direction; and a tool magazine for removably storing a plurality of tools, wherein said tool magazine is disposed between said upstanding support portions and over said workpiece support table, and that said tool magazine comprises a support bracket disposed between and secured to said support portions of said column and formed with a guide way extending in said first horizontal direction, a frame mounted on said support bracket and slidable along said guide way, linear tool support means provided on said frame for removably holding a plurality of tools in such a manner that said tools form a row extending in said second horizontal direction with the axes thereof extending in a vertical direction, and drive means connected to said frame for moving said tool support means between an advanced position where the row of said tools is presented under said tool spindle for a tool change operation and a retracted position where said row of said tools do not interfere with the machining of said workpiece, wherein said tool support means includes a supporting member secured to said frame, a slider slidably supported by said supporting member in said second horizontal direction, and a plurality of tool holders mounted on said slider each for releasably holding one of said tools, and wherein said tool magazine further comprises shifting drive means fixed to said column and connecting means provided between said shifting drive means and said slider for shifting said slider in said second horizontal direction when said shifting drive means is operated.

2. A machine tool as claimed in claim 1, wherein said connecting means comprises an engaging shaft fixed to said slider and an engaging member fixed to said shifting drive means, said engaging member being provided with a slot extending in said first horizontal direction and engageable with said engaging shaft.

3. A machine tool for machining a workpiece comprising:

a bed;

a workpiece support table slidably mounted on said bed for movement in a first horizontal direction;

a gate-shaped column having a pair of upstanding support portions fixedly mounted on said bed, said upstanding support portions being spaced in a second horizontal direction transverse to said first horizontal direction for permitting said workpiece support table to move thereacross;

a tool spindle mounted on said column for movements in a vertical direction as well as in said second horizontal direction; and a tool magazine for removably storing a plurality of tools, wherein said tool magazine is disposed between said upstanding support portions and over said workpiece support table, and that said tool magazine comprises a support bracket disposed between and secured to said support portions of said column and formed with a guide way extending in said first horizontal direction, a frame mounted on said support bracket and slidable along said guide way, linear tool support means provided on said frame for removably holding a plurality of tools in such a manner that said tools form a row extending in said second horizontal direction with the axes thereof extending in a vertical direction, and drive means connected to said frame for moving said tool support means between an advanced position where the row of said tools is presented under said tool spindle for a tool change operation and a retracted position where said row of said tools do not interfere with the machining of said workpiece, wherein said tool support means includes a supporting member secured to said frame, a pair of sliders serially disposed and shiftable in said second horizontal direction for selective support by said supporting member, and a plurality of tool holders mounted on each of said sliders each for releasably holding one of said tools in a row extending in said second horizontal direction, and wherein said tool magazine further comprises a pair of stationary guide members fixed to said upstanding support portions, each for supporting a corresponding one of said sliders while the other of said sliders is supported by said supporting member, shifting drive means fixed to said column, and connecting means provided between said shifting drive means and said pair of sliders for shifting said pair of sliders simultaneously in said second horizontal direction when said shifting drive means is operated, whereby one of said sliders is shifted from said supporting member to one of said stationary guide members while the other of said sliders is shifted from the other of said stationary guide members to said supporting member.

4. A machine tool as claimed in claim 3, wherein said connecting means comprises a pair of engaging shafts respectively fixed to said pair of sliders, and an engaging member fixed to said shifting drive means and provided with slots extending in said first horizontal direction and respectively engageable with said engaging shafts.

* * * * *